Sept. 30, 1952 C. C. CUTLER 2,612,633

MULTIPLEX CONVERTER

Filed Sept. 13, 1950 2 SHEETS—SHEET 1

INVENTOR
C. C. CUTLER
BY George C. Lord
ATTORNEY

Sept. 30, 1952 C. C. CUTLER 2,612,633

MULTIPLEX CONVERTER

Filed Sept. 13, 1950 2 SHEETS—SHEET 2

INVENTOR
C.C. CULTER
BY George C. Lock
ATTORNEY

Patented Sept. 30, 1952

2,612,633

UNITED STATES PATENT OFFICE 2,612,633

MULTIPLEX CONVERTER

Cassius C. Cutler, Gillette, N. J., assignor to Bell Telephone Laboratories, Incorporated, New York, N. Y., a corporation of New York Application September 13, 1950, Serial No. 184,679

10 Claims. (Cl. 332—7)

This invention relates to multiplex converters and more particularly to apparatus for converting time division multiplex signals into frequency division multiplex signals or vice versa at radio frequencies.

Two basic methods of multiplex signaling have been employed for the purpose of transmitting a plurality of message waves over a single communication facility. In the first of these, known as frequency division multiplex, each of the plurality of message waves is caused to modulate a different carrier wave, the frequency of which in each case is within the band-pass of the communication facility. At the receiver the various message wave modulated carriers are separated by means of filters and the message waves are recovered in individual demodulators. In the second, known as time division multiplex, the instantaneous amplitudes of several message waves are successively and periodically sampled and the samples employed to control radio frequency pulses all of the same frequency, each representing the instantaneous amplitude of one of the message waves, which are sent seriatim over a single communication facility, such as a coaxial cable or a microwave radio relay system. At the receiver the sample pulses are recovered and distributed to individual circuits corresponding to the different messages and including apparatus for reproducing the corresponding message wave from the pulses.

It is the object of the present invention to provide means for converting such time division multiplex signals directly at radio frequency into frequency division multiplex signals or vice versa.

In accordance with the invention, the basic circuit of the multiplex converter comprises an amplifier in which input pulses of center frequency F are phase-modulated at a frequency equal to one-half the repetition rate of the pulses to produce changes in opposite sense in the center frequencies of alternate ones of the applied pulses. A combination of such amplifiers, together with filters arranged to separate the two output pulses produced by each, is employed to convert time division into frequency division multiplex. Similar amplifiers, phase-modulated at a desired pulse rate, are employed both to sample a modulated carrier and to shift the center frequency of the resulting pulses by a desired amount. A combination of such amplifiers with suitable filters effects conversion from frequency division multiplex to time division multiplex.

Although the invention is applicable to multiplex systems operating over a wide range of carrier frequencies, it is of particular applicability to microwave systems and will be illustrated as arranged for use at microwave frequencies in the drawings in which.

The basic element of the multiplex converters of the present invention is a phase-modulating amplifier. As disclosed in my copending application Serial No. 173,204, filed July 11, 1950, the center frequency of a radio frequency pulse (that is the mean of the frequencies of the Fourier components the sum of which may be considered as representing the pulse) may be shifted by applying the pulse to an amplifier to which is also applied a continuous wave modulating signal, the frequency, relative phase, and mode of application being such as to produce a phase modulation of signals traversing the amplifier. The input signal may be expressed in general form as:

$$E_{in}=Ee^{j(\omega t+\Phi_0)}$$

where $\Phi_0$ is the phase angle of the input signal, and $\omega$ is the angular frequency.

The frequency F of the incoming signal (which may be taken as the center frequency) may be expressed in terms of the angular frequency according to the well-known relation:

$$F=\frac{\omega}{2\pi}$$

If now, the phase of the incoming signal is varied as a function of time during passage of the signal through the amplifier, the output signal may be expressed as follows:

$$E_{out}=E\cdot G\cdot e^{j\left(\omega t+\Phi_0+\frac{d\Phi}{dt}\cdot t\right)}=E\cdot G\cdot e^{j\left[\left(\omega+\frac{d\Phi}{dt}\right)t+\Phi_0\right]}$$

where G $(t)$ is the gain of the amplifier as a function of time and $$\left(\omega+\frac{d\Phi}{dE}\right)$$

represents a new angular frequency from which a new center frequency may be derived.

Such phase modulation may be applied to shift the center frequency of applied pulses in any amplifier system capable of transmitting the pulses. For example, there may be employed a conventional phase modulator in which a reactance tube is connected in the anode-cathode circuit of a conventional amplifier tube receiving the pulses, the modulating voltage being applied between the grid and cathode of the reactance tube. In the case of traveling wave and velocity variation tube amplifiers, the modulating voltage may be applied to vary the beam velocity.

Figure 1:
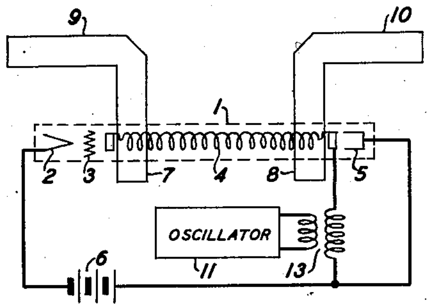
Fig. 1 is a schematic diagram of a phase-modulated amplifier suitable for use in accordance with the invention.

In a specific embodiment as illustrated in Fig. 1 of the drawings, a traveling wave tube is employed as the amplifier. Such amplifiers have been described in articles in I. R. E. Proceedings for February 1947, entitled "Traveling wave tubes" by J. R. Pierce and L. M. Field at page 108, "Theory of beam type traveling wave tubes" by J. R. Pierce at page 111, and "The traveling wave tube as amplifier at microwaves" by R. Kompfner at page 124.

The amplifier shown in Fig. 1 comprises an envelope 1 having mounted therein a cathode 2, a grid 3, a helix 4 and a collector 5. A source of direct-current voltage 6 is connected between the helix and cathode to render the former positive with respect to the latter, and the collector is operated at substantially the same voltage as the helix. Input and output connections to the amplifier are made by means of suitable transducers 7 and 8 connected to input and output wave guides 9 and 10. Radio frequency pulses applied to the input of the amplifier through wave guide 9 may be phase-modulated by varying the velocity of the electron beam while each of the pulses is traversing the amplifier. This may be accomplished by applying a periodic wave between the cathode and helix in series with the direct-current supply 19. As shown in Fig. 1, for example, a continuous wave is generated in an oscillator 11 and applied to the primary winding of a transformer 13, the secondary winding of which is inserted in the cathode-helix supply circuit.

Figure 2:
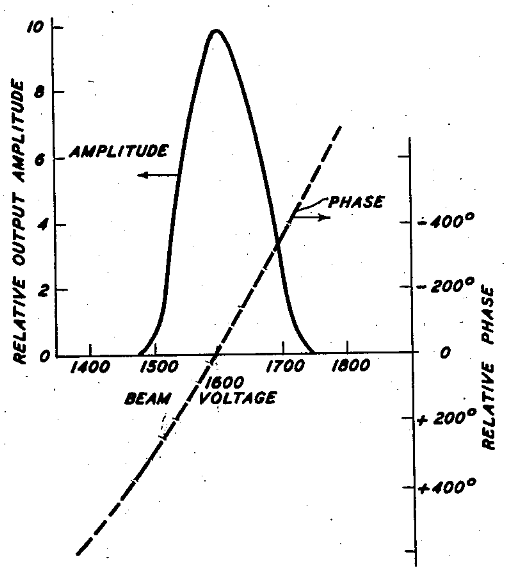
Figs. 2 and 3 are graphs illustrating certain of the operating characteristics of the circuit of Fig. 1.

As pointed out in the articles referred to above, energy applied to the input of a traveling wave amplifier is amplified only when the velocity along the helix of the input electromagnetic wave approximates the velocity of the electron beam as determined by the cathode-helix or beam voltage. The range of beam voltages for which amplification takes place is relatively limited and is shown for a typical traveling wave amplifier by the solid curve of Fig. 2. If, however, the phase-modulating signal varies the beam voltage within the range so delineated, the phase of the output signals may be shifted relatively to that of the input signal. The dashed-line curve of Fig. 2 illustrates the extent of the phase shift obtainable in this fashion and it will be noted that positive and negative shifts of phase with corresponding changes in the center frequency of the applied radio frequency pulses may be obtained by varying the beam voltage to one side or the other of the value produced by the direct-current supply.

Experiments have shown that for pulses of center frequencies of about 4000 megacycles, it is possible to produce a shift in center frequency as great as 500 megacycles. If, therefore, the frequency of the phase-modulating signal from oscillator 11 is properly related to the repetition frequency of the pulses applied to the traveling wave amplifier and the two signals are properly phased, each pulse occurs during the time in which the same relative change in transmission velocity is made within the traveling wave tube and each of the pulses traversing the amplifier is, therefore, given the same shift in center frequency. Ordinarily this is best accomplished by making the frequency of the modulating signal equal to the repetition rate or frequency of the pulses. If the frequency of the phase-modulating signal is an even sub-multiple of the repetition frequency of the pulses, alternate pulses may be shifted in center frequency in opposite senses.

In addition, the frequency shifting pulse repeater employing a traveling wave tube may be operated in such a way as to provide pulse shaping or gating action without the necessity of using any additional equipment. This pulse shaping or gating action is produced by suitable choice of the characteristics of the continuous wave signal used to obtain frequency shifting. It will be recalled from the above that the traveling wave tube amplifier will give effective amplification only when the beam voltage falls within a relatively restricted range of values as indicated in Fig. 2. If, during the time that electromagnetic energy is passing along the helix of the traveling wave tube, the beam voltage is swept through the range of values referred to above, the amplification afforded by the tube will be correspondingly varied. Thus, where the rate of change of beam voltage is such that during the time a radio frequency pulse is progressing along the helix of the tube, the beam voltage is swept from a value below the range permitting amplification through the amplifying region and beyond, certain portions of the pulse will be amplified to a greater extent than others.

Figure 3:
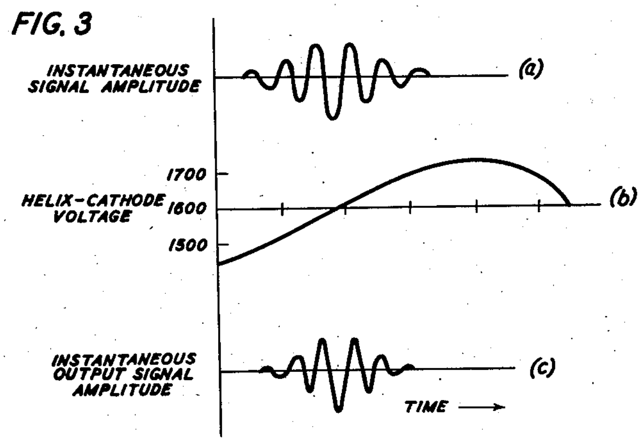

The effect of such variation in amplification, during the time in which a radio frequency pulse is traversing the traveling wave tube, is illustrated by the curves of Fig. 3. Curve *a* illustrates a typical radio frequency pulse of the type which may be employed in microwave pulse modulation systems. If, while this pulse is passing through a traveling wave amplifier having the characteristics shown in Fig. 2, the amplification thereof is varied by changing the helix-to-cathode voltage as shown in curve *b*, the net result will be the production of a pulse as shown in curve *c* which is sharper than the applied pulse, since the maximum amplification occurs only during the center portion of the pulse. Since the change in beam voltage also produces phase modulation as described above and depending upon the sense in which the helix-to-cathode voltage is changing at the time the pulse passes through the amplifier, the center frequency of the pulse may be increased or decreased at the same time that sharpening of the pulse occurs. Necessarily, the extent to which a pulse is sharpened depends upon the rate at which the beam voltage is swept through the critical range. Where the signal injected to produce frequency shifting and pulse sharpening is sinusoidal, the maximum time rate of change of beam voltage occurs as the sine wave passes through zero amplitude on curve *b* of Fig. 3. The slope of the modulating wave at this point and thus the pulse sharpening or gating action may be varied either by increasing the frequency of the modulating sinusoid or by increasing the amplitude of the wave so that the entire range of amplification of the traveling wave tube is covered by a relatively small part of the total amplitude of the modulating wave.

This action of the traveling wave amplifier in response to the variation of beam voltage may thus be made so pronounced that pulses may be gated or generated from a continuous radio frequency wave applied to the amplifier in lieu of the pulsed input heretofore considered. Under such circumstances, because the helix-to-cathode voltage varies sinusoidally, pulses will be produced at the output of the amplifier twice during each cycle of the modulating wave and will have center frequencies which are alternately higher and lower than the original frequency of the continuous wave input signal. In one typical system, pulses as short as 0.002 microsecond have been produced by gating a continuous wave input having a frequency of 4000 megacycles per second. Since the accompanying frequency shift may be as great as 500 megacycles per second, it is possible to separate the pulses occurring alternately in the amplifier output with conventional wave-guide filters.

From the above it will be seen that two of the necessary functions for converting multiplex signals, frequency shifting and sampling, may be accomplished at microwave frequencies in a single tube. Obviously, it is possible to separate the gating and frequency shifting functions and to perform them separately by well-known methods. Thus for operation at frequencies of the order of kilocycles, for example, the gate or sampling device may comprise a conventional vacuum tube having at least two grid elements to one of which the continuous wave is applied and to the other of which a pulse gating signal is applied. The frequency shifting function may be performed by any conventional phase modulator.

Figure 4:
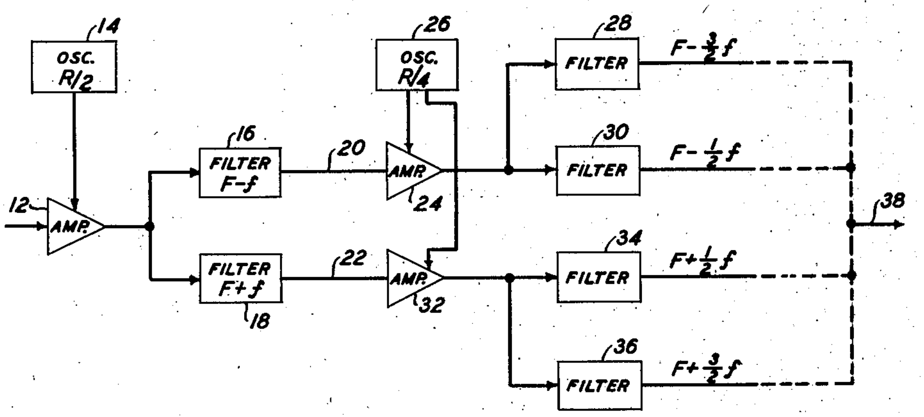
Fig. 4 is a block diagram of apparatus according to the invention for converting a time division multiplex signal into a frequency division multiplex signal.

In Fig. 4 there is shown apparatus for effecting conversion from time division multiplex to frequency division multiplex as arranged for operation at microwave frequencies. Let it be assumed that the signal applied at the left-hand side of the diagram is a time division multiplex signal wherein successive pulses periodically represent samples of four different message waves and that these pulses occur at a repetition rate R. This time division multiplex signal is first applied to an amplifier 12 which may be a traveling wave amplifier as described above, and the beam voltage of this amplifier is varied sinusoidally at a frequency equal to $R/2$ by means of a modulating wave obtained from an oscillator 14. The amplitude and relative phase of the modulating wave are so chosen that the center frequency of each of the applied pulses is shifted by an amount $f$ during its traversal of the amplifier. Because of the interrelationship chosen between the repetition rate of the pulses and the frequency of the modulating wave, the center frequency of alternate pulses will be shifted $+f$ and $-f$, respectively. The output of amplifier 12 is applied to the inputs of two filters 16 and 18, the pass bands of which are arranged to accept, respectively, pulses of center frequency $F-f$ and $F+f$. For operation at microwave frequencies, these filters may conveniently comprise the double iris, wave-guide resonant cavity filters as disclosed, for example, in Patent No. 2,432,093 to A. G. Fox, December 9, 1947, although, of course, any filter capable of operating at the desired frequency may be employed.

As a result of the action of amplifier 12 and filters 16 and 18, the four message waves represented by pulses occurring serially at the input of the amplifier are thus divided into two separate channels 20 and 22, the pulses in channel 20 representing, for example, the first and third message waves and the pulses in the other channel representing the remaining message waves. The same process is repeated to separate the two message wave pulses present in each of channels 20 and 22. Considering channel 20, for example, we see that there are present therein pulses occurring at a repetition rate equal to $R/2$ and at a center frequency of $F-f$. These pulses are applied to amplifier 24 and this amplifier is phase-modulated by a sinusoidal wave obtained from an oscillator 26 at a frequency equal to one-quarter the original repetition rate or one-half the repetition rate of the pulses in channel 20. In this instance, the phase-modulating signal is so chosen that shifts in center frequency of $\pm f/2$ are produced in alternate ones of the pulses applied to the amplifier, this result being accomplished by appropriate choice of the amplitude of the modulating wave. There is present, therefore, in the output of amplifier 24 a series of pulses, the center frequencies of which are alternately $F-3f/2$ and $F-f/2$. These pulses are applied to band-pass filters 28 and 30, respectively, these filters being of the same type as filter 16 and being designed to accept the respective pulse frequencies.

By a similar process the pulses of frequency $F+f$ occurring in channel 22 and representing the remaining pair of message waves are divided into pulses of frequencies $F+f/2$ and $F+3f/2$, amplifier 32 being identical to amplifier 24 and phase-modulated by the same modulating signal from oscillator 26, and filters 34 and 36 being the same as filters 28 and 30 except for the pass bands thereof.

The output circuits of the four filters 28, 30, 34 and 36 are connected together and to a single output circuit 38. Since the pulses applied to filters 28, 30, 34 and 36 are relatively sharp, their frequency spectra may overlap. Consequently the four filters just referred to are made relatively narrow-band in order to reduce the pulse spectra so that the frequencies of the four pulses appearing at output circuit 38 will not interfere with each other. Furthermore, and as would be desirable in most instances, filters 28, 30, 34 and 36 may be made sufficiently sharp (narrow-band) to produce continuous wave outputs.

The circuit described provides means for converting a four-channel time division multiplex signal into a corresponding frequency division multiplex signal. It will be recognized, of course, that the process may be continued through the addition of an amplifier and a pair of filters to the output of each of the output filters and the provision of means for phase-modulating the additional amplifiers at the proper frequencies. Thus time division signals having any even number of time channels may be converted directly into corresponding frequency division signals. In a typical four-channel system according to the invention, the time division multiplex signals comprise one-tenth microsecond pulses at a repetition rate of 5 megacycles per second and a center frequency of 4000 megacycles per second. Amplifier 12 is supplied with phase-modulating oscillations having a frequency of 2½ megacycles per second and of such amplitude as to give a frequency shift of ±10 megacycles per second. The center frequencies of the alternate pulses applied to filters 16 and 18 are then 3990 and 4010 megacycles per second, respectively. Amplifiers 24 and 32 are phase-modulated at a frequency of 1.25 megacycles per second to produce a frequency shift of ±5 megacycles and the pass bands of filters 28, 30, 34 and 36 are then chosen at 3985, 3995, 4005 and 4015 megacycles per second, respectively, and these filters are so chosen as to provide continuous wave signals corresponding to each of the four message waves in output circuit 28.

Figures 5, 6:
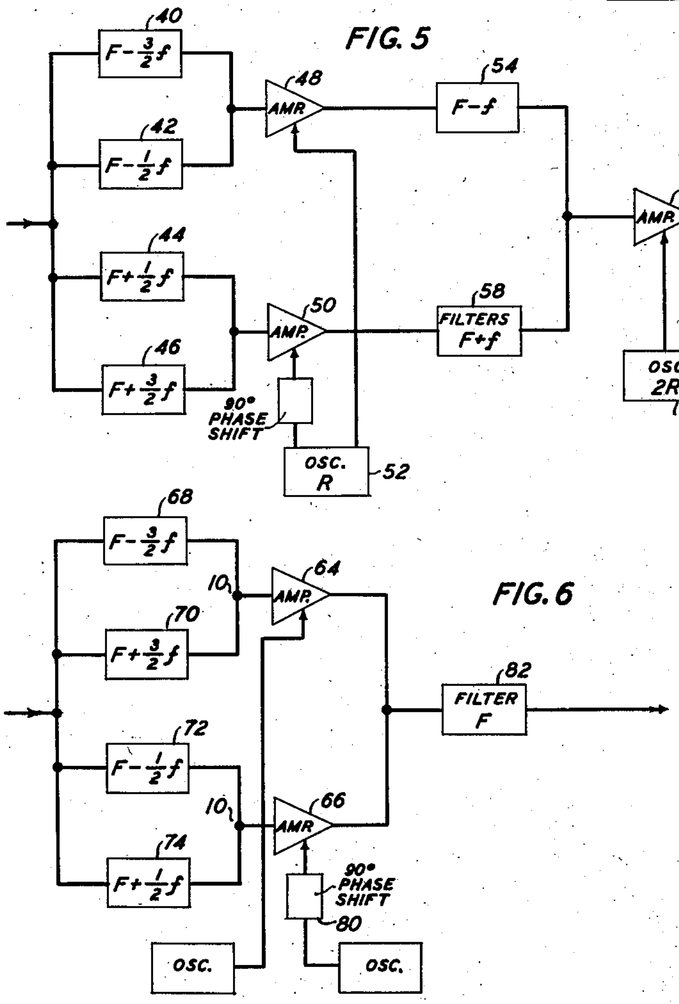
Fig. 5 is a block diagram of apparatus for converting a frequency division multiplex signal into a time division multiplex signal.
Fig. 6 is a block diagram of a modification of the apparatus of Fig. 5.

Apparatus for converting frequency division multiplex signals into time division multiplex is illustrated in Fig. 5. Here again it will be assumed that the frequency division signal represents four different message waves. As in the case of the conversion from time division to frequency division, however, additional channels may be handled by duplication of various portions of the apparatus so long as the number of channels contemplated is a power of two. In the system of Fig. 5, the frequency division multiplex signal representing four continuous message waves and comprising four different carriers separated by frequency intervals $f$ modulated by such message waves is applied to the inputs of four of filters 40, 42, 44 and 46. For use at microwave frequencies, these filters may comprise double iris wave-guide filters of the same type as employed in the converter of Fig. 4. Filters 40 and 42 have pass bands centered upon frequencies $F-3f/2$ and $F-f/2$, where F is the center frequency ultimately desired for the time division multiplex output pulses. Similarly, filters 44 and 46 have pass bands centered upon center frequencies $F+f/2$ and $F+3f/2$.

It will be noted that filters 40 and 42 accept carrier frequencies lower than the desired output pulse center frequency, while filters 44 and 46 accept signals of frequencies higher than that frequency. It will be understood, in addition, that the pairs of filters 40 and 42 and 44 and 46 may each be combined in a single filter if it is convenient to provide filters having such pass bands. The output signals of filters 40 and 42 comprising the modulated carrier signals of frequencies lower than the desired pulse output frequency are applied to an amplifier 48 while the remaining carrier frequency signals are applied from filters 44 and 46 to a similar amplifier 50. As in the case of the apparatus of Fig. 1, these amplifiers may be of any suitable type and, for use at microwave frequencies as described herein, may comprise traveling wave amplifiers.

Provision is made for phase modulating in each of these amplifiers at a frequency equal to the desired repetition rate R for the pulses representing each channel. In the case of amplifier 48, this is accomplished by means of a sinusoidal wave derived from an oscillator 52 of frequency R and of amplitude appropriate for the production of a frequency shift of $f/2$. As has been pointed out above, such a modulating wave will upon alternate half cycles shift the center frequency of signals applied to the amplifier alternately $\pm f/2$. At the same time, the gating action of the traveling wave amplifier referred to above may be made effective. Thus if the amplitude of the modulating wave is considerably greater than the range of beam voltages for which the traveling wave tube provides amplification, the amplifier may be caused in addition to shifting the frequency of applied signals also to gate such signals to produce pulses therefrom. Thus during one half cycle of the modulating wave, each of the carriers $F-3f/2$ and $F-f/2$ undergoes a frequency shift of $-f/2$ becoming, respectively, $F-f/2$ and $F-f$. At the same time as these frequency shifts are produced, the gating action of the amplifier forms a pulse so the output of the amplifier includes pulses having center frequencies $F-f/2$ and $F-f$. A filter 54 is connected in the output of amplifier 48 and arranged to pass only the frequency $F-f$. Thus once during each cycle of the modulating wave, a pulse corresponding to the carrier wave applied to input filter 42 appears at the output of filter 54. The pulse corresponding to the other carrier applied to amplifier 48 is suppressed at this time. Upon the next half cycle of the modulating wave, however, the frequency shift produced by the phase modulation is in the other sense, that is, $+f/2$ with the result that the output of amplifier 48 at this time includes pulses of frequency $F-f$ and F corresponding, respectively, to the carrier frequencies at the outputs of filters 40 and 42. Of these only the pulse corresponding to the output of filter 40 traverses filter 54. Thus the output of filter 54 comprises pulses of center frequency $F-f$, alternately representing the amplitudes of the modulation upon the carriers traversing filters 40 and 42, respectively.

Amplifier 50 is supplied with a phase modulating sinusoidal wave from the same source 52 as the modulating wave applied to amplifier 48. In this case, however, the sinusoidal wave traverses a phase shifting network 56 which introduces a phase shift of 90 degrees. Phase modulation in amplifier 50 is accomplished in the identical manner to the phase modulation of amplifier 48 and this operation, together with the action of a filter 58 connected in the output of the amplifier and accepting only pulses of frequency $F+f$ results in the production of pulses at the output of filter 58 of center frequency $F+f$ which alternately represent the amplitude of the modulation upon the carriers traversing filters 44 and 46, respectively, and are interleaved in time with the pulses at the output of filter 54.

The pulses appearing at the outputs of filters 54 and 58 are applied to an additional amplifier 60 which is identical to amplifiers 48 and 50. This amplifier is supplied with a phase modulating sinusoidal wave derived from an oscillator 62 the frequency of which is twice the frequency of oscillator 52, this modulating wave having an amplitude sufficient to cause shifts of center frequency of $\pm f$, respectively, in alternate ones of the pulses applied to the amplifier. As a result of this phase modulation all pulses appearing at the output of amplifier 60 are of center frequency F. Here again, the pulses representing each individual message wave occur at a repetition rate R. A filter 63 is provided at the output of amplifier 60 to accept pulses of this center frequency and to reject any extraneous frequency components which may have been introduced as a result of the phase-modulation process. The output of this filter thus comprises a series of pulses occurring periodically at a center frequency F and representing successively the four message waves which were applied to filters 40, 42, 44 and 46 in the form of a frequency division multiplex signal. As has been suggested above, this converter may be expanded to accept a frequency division multiplex signal having twice as many message wave channels merely by providing an additional stage including suitable input filters each accepting one-half the band of applied carrier frequencies, each of said input filters having associated therewith an amplifier which may be phase-modulated to accomplish the necessary frequency shifting operation.

Within limits, the circuit of Fig. 2 may be simplified somewhat with a resultant saving in equipment by a modification in the choice of filter pass bands and by a change in the nature of the phase modulating signals. In effect, an additional oscillator is inserted and an amplifier is eliminated from the circuit. This may be economical and practicable at certain center frequencies at which provision of suitable amplifiers may be costly, inasmuch as oscillators suitable for use at the much lower repetition rates required may be easily realizable. Such a modification of the circuit of Fig. 2 is illustrated in Fig. 3. Here the input filters, corresponding to filters 40, 42, 44 and 46 of Fig. 2, are arranged in a different manner and, as before, a pair of phase-modulated amplifiers 64 and 66 is provided. In this arrangement, filters 68 and 70, connected between the frequency division input and amplifier 64, are arranged to accept the pair of carrier frequencies farthest removed from the desired center frequency F while filters 72 and 74, connected in the input of amplifier 66, are arranged to accept the pair of carrier frequencies less far removed from the desired center frequency F. Thus the signals applied to the input of amplifier 64 have carrier frequencies removed by $\pm 3f/2$ from the desired center frequency while the carrier signals applied to the input of amplifier 66 are of frequency removed $\pm f/2$ of the desired center frequency. A phase-modulating signal is applied to amplifier 64 comprising a sinusoidal wave derived from an oscillator 76 having a frequency equal to the desired repetition rate R for the pulses representing each message channel and an amplitude which will result in a frequency shift of $3f/2$. The phase-modulating wave applied to amplifier 66, on the other hand, is derived from an oscillator 78. This sinusoidal wave has a frequency equal to the desired repetition rate R and is applied to the amplifier through a phase shifting network 80 so that the phase-modulating waves applied to the two amplifiers are in quadrature. In addition, the amplitude of the wave from oscillator 78 is such as to cause a frequency shift of $f/2$ in amplifier 66.

As a result of the phase-modulation process produced in each of amplifiers 64 and 66, all pulses appearing at the output of the two amplifiers are of center frequency F, the pulses at the output of amplifier 62 being interleaved with those from amplifier 66. The two amplifier outputs are connected to an output filter 82 which rejects all frequency components except F. As a result, the time division multiplex output is obtained in one step rather than the two steps required in the apparatus of Fig. 2.

What is claimed is:

1. An amplifier for alternately making equal and opposite changes in the center frequency of applied pulse signals of fixed repetition rate comprising an amplifier for said pulses, a source of oscillating waves of frequency related to the repetition rate of said pulse signals by a factor of two, and means for applying said wave to said amplifier to phase-modulate each pulse as it traverses said amplifier.

2. Apparatus for alternately making changes of equal extent but opposite sense in the center frequency of successive periodic pulses comprising a traveling wave amplifier having a cathode and a helix, means for applying said pulses to said helix, means for sustaining a beam of electrons adjacent to and parallel to said helix at a velocity approximating the velocity of said pulses upon said helix, and means for operating upon the beam alternately to increase and decrease its velocity as alternate pulses are present upon said helix.

3. Apparatus for alternately shifting the center frequency of applied periodic pulses by equal amounts but in opposite sense comprising a traveling wave tube amplifier, means for applying said pulses thereto, and means for phase-modulating the pulses in said amplifier at a frequency related to the periodicity of said pulses by a factor of two.

4. Apparatus for shifting the center frequency F of applied periodic pulses comprising an amplifier for said pulses, means for phase-modulating the pulses in said amplifier at a frequency equal to one-half the repetition rate of said pulses to make changes of $\pm f$ respectively in the center frequencies of alternate pulses, and a pair of output circuits accepting respectively pulses of center frequencies $F+f$ and $F-f$.

5. Apparatus for shifting the center frequency F of applied periodic pulses comprising an amplifier for said pulses, means for phase-modulating said amplifier at a frequency equal to one-half the repetition rate of said pulses to produce changes of $\pm f$ respectively in center frequency of alternate ones of said pulses, a pair of output circuits accepting respectively pulses of center frequencies $F+f$ and $F-f$, an amplifier in each of said output circuits, and means for phase-modulating the pulses in said last-mentioned amplifier at one-quarter the repetition rate of the applied periodic pulses to produce changes of $\pm f/2$ in the center frequencies of the pulses therein and separate output circuit for each amplifier for pulses of each of the two different center frequencies so produced.

6. Apparatus for converting pulse time division multiplex signals wherein periodic pulses of center frequency F represent different message channels into frequency division multiplex wherein the pulses representing the different message channels are given different center frequencies comprising an amplifier for said pulses, means for phase-modulating said pulses in said amplifier at a frequency equal to one-half the repetition rate of said pulses to produce changes of $\pm f$ respectively in the center frequency of alternate ones of said pulses, a pair of output circuits accepting respectively pulses of center frequencies $F+f$ and $F-f$, second and third amplifiers connected respectively in said output circuits, means for phase-modulating the pulses in said second and third amplifiers at a frequency equal to one-quarter the repetition rate of said periodic pulses to produce frequency changes of $\pm f/2$ respectively in the center frequencies of pulses therein, separate output circuits for said second amplifier accepting respectively pulses of center frequencies $F+f/2$ and $F+3f/2$ and corresponding circuits in the output of said third amplifier accepting pulses of center frequencies $F-f/2$ and $F-3f/2$.

7. Apparatus for converting a pair of amplitude-modulated message signals having carriers of different frequencies into a pulse amplitude-modulated time division multiplex signal wherein each message is represented by a series of pulses of repetition rate R, the pulses of said series being interleaved and having a center frequency F, removed by a quantity $f$ from each of said carriers comprising means for sampling said message signals at a repetition rate R and producing in alternate samples frequency shifts of $\pm f$ respectively, and an output circuit for said last-mentioned means accepting only pulses of said center frequency F.

8. Apparatus for converting a pair of amplitude-modulated message signals having carriers of different frequencies into a pulse amplitude-modulated time division multiplex signal wherein each message is represented by a series of pulses of repetition rate R, the pulses of said series being interleaved and having a center frequency F, removed by a quantity $f$ from each of said carriers comprising a traveling wave amplifier accepting both of said message signals, said amplifier including a helical transmission line and means for producing an electron beam adjacent thereto, and providing amplification only when beam velocity falls within a limited range approximating the velocity of the signal in said line, means for applying the signal to said line, means for phase-modulating said signal in said line to produce alternately shifts of $\pm f$ in center frequency of said signals including a source of sinusoidal waves of frequency R and amplitude large with respect to said range and means for applying said waves to vary the beam velocity, and an output circuit for said amplifier accepting only pulses of center frequency F.

9. Apparatus for converting frequency division multiplex signals wherein four messages are transmitted at different carrier frequencies equally spaced by an amount $f$ into time division multiplex signals wherein each message is represented by a series of pulses of repetition rate R interleaved with other series of pulses, all of the pulses having a center frequency F which in the mean of said carrier frequencies comprising, a pair of filters for dividing incoming signals and applying them to two channels, one accepting frequencies higher than said mean and the other those lower than said mean, a traveling wave amplifier in each of said channels, each of said amplifiers including a helical transmission line and means for producing an electron beam adjacent thereto, and providing amplification only when beam velocity falls within a limited range approximating the velocity of the signal in said line, means for applying the signals in each channel to the corresponding amplifier, means for phase-modulating the signals in said amplifiers in quadrature to produce alternately frequency shifts of $\pm f$ in the center frequency of applied signals, said means comprising apparatus for generating two sinusoidal waves in quadrature, each of frequency R and of amplitude large with respect to said range, and means for applying said waves to the two amplifiers respectively to vary the beam velocity in each case, filters following the amplifiers in each channel and passing respectively pulses of center frequencies $F+f$ and $F-f$, a third traveling wave amplifier identical to said amplifiers, means for applying the output of both of said filters thereto, means for phase-modulating pulses therein at a rate of 2R to shift the center frequency of alternate pulses $\pm f$, and a filter accepting only pulses of center frequency F.

10. Apparatus for converting frequency division multiplex signals wherein four messages are transmitted at different carrier frequencies equally spaced by an amount $f$ into time division multiplex signals wherein each message is represented by a series of pulses of repetition rate R interleaved with other series of pulses, all of the pulses having a center frequency F which in the mean of said carrier frequencies comprising, a pair of filters for dividing incoming signals and applying them to two channels, one accepting the pair of frequencies nearest said mean frequency F and the other the pair farthest removed from said mean frequency, a traveling wave amplifier in each of said channels, each of said amplifiers including a helical transmission line and means for producing an electron beam adjacent thereto, and providing amplification only when beam velocity falls within a limited range approximating the velocity of the signal in said line, means for applying the signals in each channel to the corresponding amplifier, means for phase-modulating the signals in said amplifiers in quadrature to produce alternately frequency shifts of $$\pm\frac{1}{2}f \text{ and } \pm\frac{3}{2}f$$

respectively in the center frequencies of applied signals, said means comprising separate sources of sinusoidal waves of repetition rate R, each of said waves being of amplitude which is large with respect to said range, and a filter accepting only pulses of center frequency F connected in the output circuits of both of said amplifiers.

CASSIUS C. CUTLER.

REFERENCES CITED

The following references are of record in the file of this patent:

UNITED STATES PATENTS

| Number | Name | Date |
|---|---|---|
| 2,300,052 | Lindenblad | Oct. 27, 1942 |
| 2,433,342 | Catterjea | Dec. 30, 1947 |
| 2,521,760 | Starr | Sept. 12, 1950 |